United States Patent [19]
Ottenbruch et al.

[11] Patent Number: 6,058,795
[45] Date of Patent: May 9, 2000

[54] ADJUSTMENT DEVICE FOR AUTOMATICALLY OPERATING A TRANSMISSION

[75] Inventors: Peter Ottenbruch, Schonungen/Mainberg; Lutz Leimbach, Schweinfurt; Bernd Gaubitz, Schonungen/Forst; Hans-Jürgen Schneider, Stettbach; Thomas Wirth, Schwanfeld, all of Germany

[73] Assignee: Mannesmann Sachs AG, Schweinfurt, Germany

[21] Appl. No.: 09/128,069

[22] Filed: Aug. 3, 1998

[30] Foreign Application Priority Data

Aug. 4, 1997 [DE] Germany ............... 197 33 621

[51] Int. Cl.⁷ .................................................. F16H 61/26
[52] U.S. Cl. ................. 74/473.18; 74/473.1; 74/473.15; 74/335
[58] Field of Search ................ 74/473.18, 473.1, 74/473.15, 335; 477/906; 701/62

[56] References Cited

U.S. PATENT DOCUMENTS 5,799,539  9/1998  Haase ................................. 74/473.18

FOREIGN PATENT DOCUMENTS

| 39 40 590 | 6/1990 | Germany . |
| 39 00 987 | 7/1990 | Germany . |
| 36 13 800 | 12/1994 | Germany . |
| 195 46 631 | 6/1997 | Germany . |

*Primary Examiner*—Thomas R. Hannon
*Assistant Examiner*—David M. Fenstermacher
*Attorney, Agent, or Firm*—Cohen Pontani, Lieberman & Pavane

[57] ABSTRACT

An adjustment device for automatically operating a vehicle transmission, includes an actuator to operate a gear input part that, depending upon a desired gear, assumes a position corresponding to that gear. An emergency operating device is connected to the actuator for activating a tension element to establish an active connection to the gear input part for the purpose of setting a position of the gear input part corresponding to a selected gear during a failure of the actuator.

13 Claims, 3 Drawing Sheets

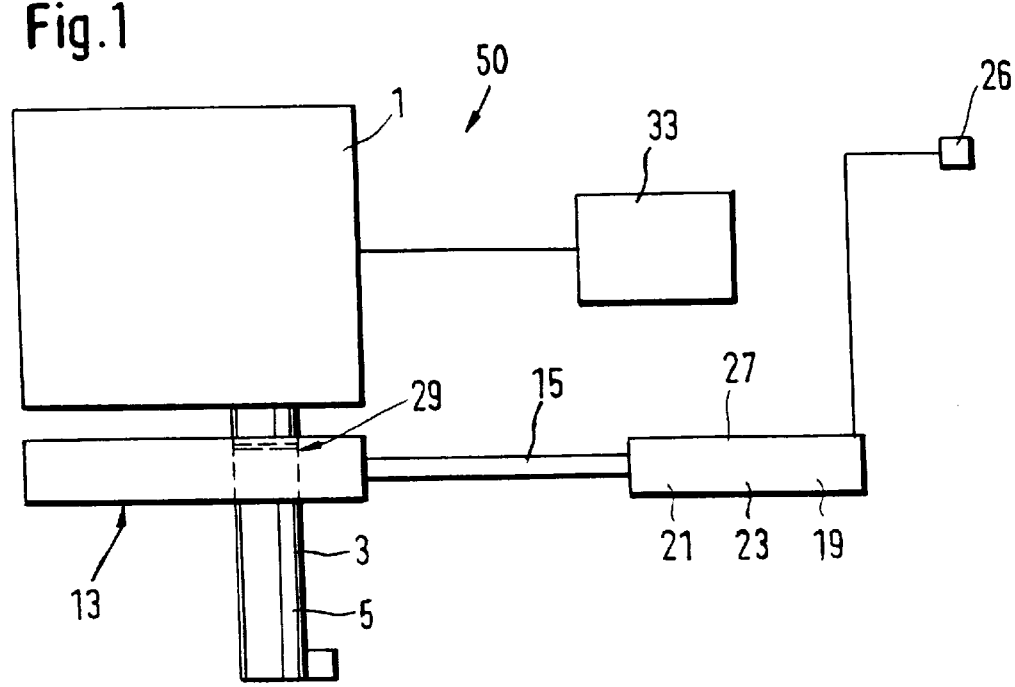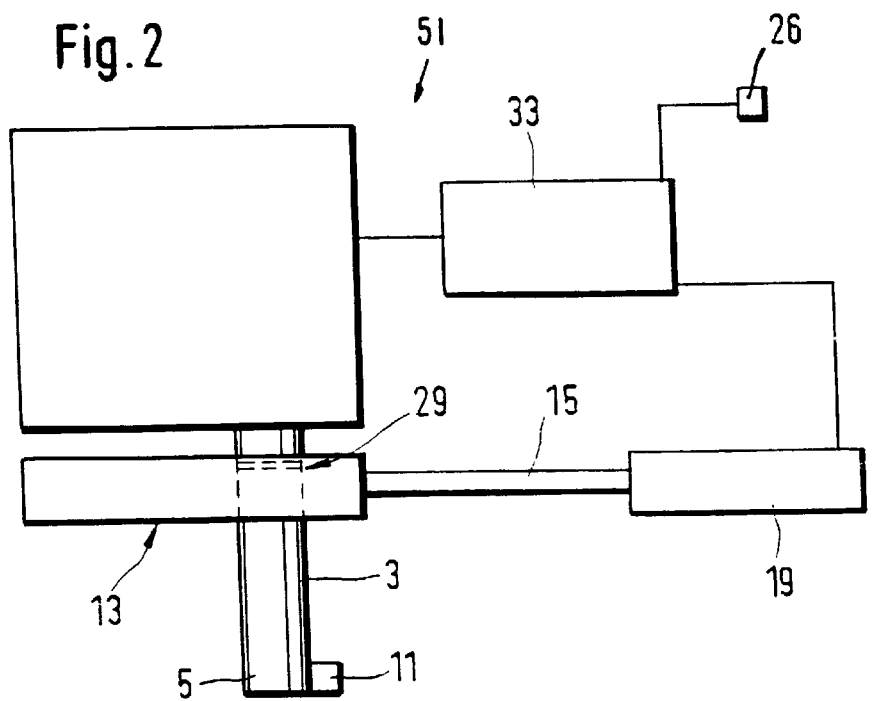

ADJUSTMENT DEVICE FOR AUTOMATICALLY OPERATING A TRANSMISSION

BACKGROUND OF THE INVENTION

1. Field of the Invention

The invention relates to an adjustment device for automatically operating a vehicle transmission.

2. Description of the Related Art

A transmission actuator is known from DE 296 22 669 U1 that drives a gear input part in two directions of motion. This transmission actuator encompasses two drives that are triggered by a control system to assume a position corresponding to a desired gear position. If the actuator fails entirely or at least partly, the transmission is maintained in the gear position that is in place when the transmission actuator fails. A problem with these prior art devices is that the vehicle may not be operable in this gear position in which the transmission is stuck.

SUMMARY OF THE INVENTION

The object of the invention is to provide an adjustment device with an actuator for automatically operating a vehicle transmission such that, in the event of a failure of the actuator, at least start-up and limited driving operation of the vehicle are possible.

The object of the invention is attained by an adjustment device having an actuator operatively connected to a gear input part for moving the gear input part to a position corresponding to a desired gear and an emergency operating device which includes a tension element activatable for setting a position of the gear input part. The emergency operating device for the actuator enables emergency operation of the transmission. The tension element is activated by the emergency operating device. Activating the tension element places the tension element into active contact with the gear input part, if these are not already in active contact. The continuous activation of the tension element ensures that the gear input part assumes a position corresponding to a specific driving gear. Preferably, the position to be assumed is predetermined to be that which corresponds to the second gear of the transmission, because it is possible to start a vehicle in second gear, even on an incline. Furthermore, the driving speed in second gear is acceptable to reach the next service station or repair shop.

The actuator is connected to the gear input part by a coupling link. If the actuator fails the emergency operating device releases the rotation-proof and fixed connection provided by the coupling link between the actuator and the gear input part. It is advantageous that the actuator is rotary-mounted on the gear input part, so that when the coupling link is released, the approximate position of the actuator is maintained despite disruptive influences, such as vibrations transmitted from the motor to the actuator. The release of the coupling link enables emergency operation of the gear input part even when movement of the gear input part is prevented by blockage of the actuator. Moreover, the power needed for emergency operation is substantially less, because the components of the actuator otherwise standing in active connection to the gear input part do not have to be moved as well. This coupling link also enables the installation of the actuator as a modular component in the final assembly and connect it the gear input part by the coupling link. Therefore, the coupling link itself is advantageous even if no emergency operating device is present. Furthermore, the actuator can easily be exchanged by releasing the coupling link.

It has also proved advantageous to provide a means for the driver to manually activate the tension element. As a result, an emergency operating device is available even if a control device associated with the actuator fails. If the driver has a breakdown in the vehicle, and recognizes from the vehicle reaction that the actuator has failed, e.g., if he is prevented from placing the vehicle into a starting gear, it is still possible for him to place the vehicle into a predetermined gear by manually activating the tension element. Such manual operation may be executed from inside the vehicle by providing an operating element that, in normal operation, is preferably covered by a covering unit, so that it is prevented from being accidentally operated.

It has proved advantageous to provide a drive module to activate the tension element. This drive module may be provided in addition to the operating element for manual use. If the drive module is provided in addition to the operating element, then the drive module is triggered first. However, if the drive module cannot be operated, the driver still has the option to activate the tension element manually. The drive module may comprise an energy storage device or a pressure storage device, which is held in a pre-stressed position by a fixing device. When released, the drive module operates the tension element. The fixing device is configurable such that it can be manually released by the driver. Moreover, the drive module may also comprise an electric motor. For emergency operating devices of this type, machines with limited power are adequate, since the speed at which the predetermined gear is engaged plays a subordinate role due to the unique engagement procedure used in the context of emergency operation. Such drives can be purchased as standard component parts at a reasonable price.

It has proved advantageous to provide a manual control element by means of which the driver can initiate activation of the emergency operating device. Furthermore, the emergency operating device can be configured in such a way that it is activated by the control device if the actuator fails. Moreover, in addition to activating the emergency operating device by means of the control device, the manual control element can be provided, so that emergency operation is triggered if the control device fails.

It has proved advantageous to provide an elastic element, for example, a wire cable, to serve as the tension element. This tension element may be glued or clipped into the gear shifting gate. When the emergency operating device is activated, the tension element is released from its attachment and comes into active contact, for example, with a movable projection on the gearshift shaft in the gear shifting gate. The projection is drawn by means of the tension element into the position corresponding to the preset gear. The tension element may also be firmly fixed to the central gearshift shaft or a projection on the gear input part.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 shows an adjustment element according to an embodiment of the invention with a transmission actuator and an associated emergency operating device;

FIG. 2 shows another embodiment of the adjustment element according to the invention with an emergency operating device and a drive module activatable via a control device;

DETAILED DESCRIPTION OF THE PRESENTLY PREFERRED EMBODIMENTS

Figure 3:
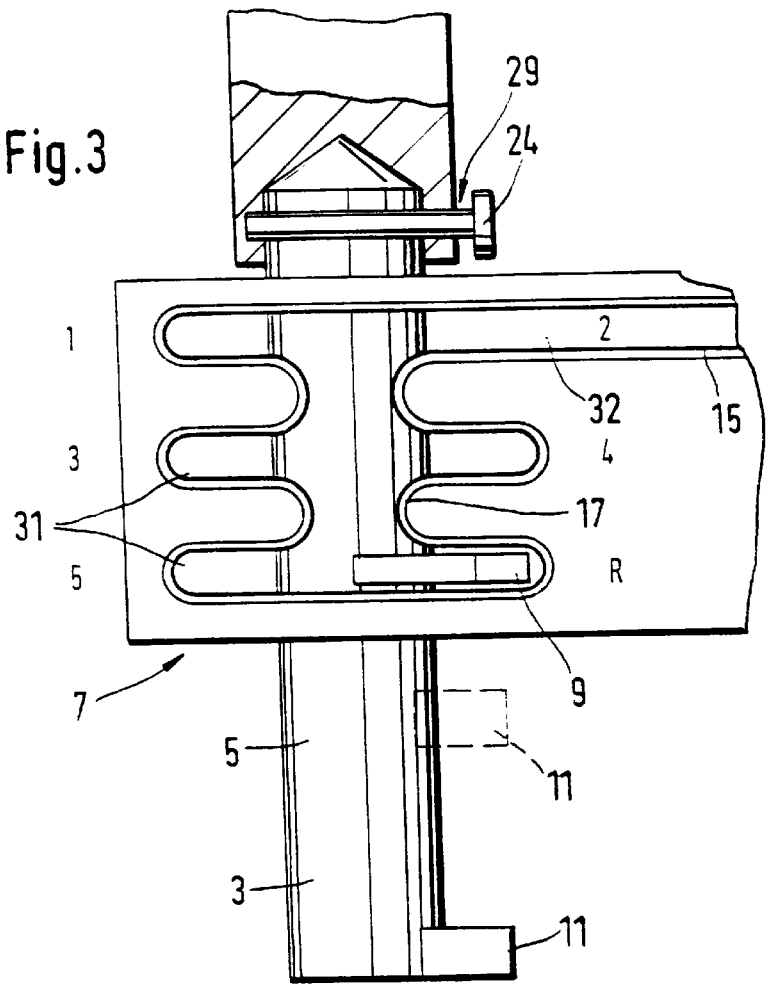
FIG. 3 shows a gear shifting gate of the adjusting element with a tension element.

Referring to FIG. 1, an adjustment device 50 according to the present invention includes an actuator 1 that automatically operates a gearbox of a vehicle transmission. The actuator 1 is connected to a gear input part 3, which in this case, is the central gearshift shaft 5. Associated with the actuator 1 is a control device 33, to which are fed a plurality of signals characterizing the operating state of a vehicle in which the adjustment device 50 is positioned. An emergency operating device 13 is arranged on the gear input part 3 between the actuator 1 and the transmission. This emergency operating device 13 may also be integrated into the actuator 1. This emergency operating device 13 comprises a coupling link 29 which connects the actuator 1 to the central gearshift shaft 5 during normal operation of the adjustment device 50. This coupling link 29 is releasable by operation of the emergency operating device 13. Referring to FIG. 3, coupling link may comprise a removable connecting pin 24. This connecting pin 24 is connected to a tension element 15 on the emergency operating device 13. The tension element 15 may be attached to the gear shift gate 7 by, for example, gluing or clipping, as in FIG. 3. Preferably, guides 17 are associated with the tension element 15 for properly positioning the tension element 15 in the gear shift gate 7. A projection 9 connected to and radially extending from the gearshift shaft 5 is freely movable within the gear shifting gate 7. The gearshift shaft 5 is also provided with a gearshift finger 11 that projects into the transmission of the motor vehicle in which the adjustment device is disposed (the transmission and motor vehicle are not shown).

In the example shown in FIG. 1, the tension element 15 is connected to a drive module 19, which in turn is associated with a manual control element 26. This manual control element 26 is preferably installed in the vehicle interior, such that it is accessible to the driver of the vehicle.

Referring now to FIG. 2, another embodiment of an adjustment device 51 comprises the drive module 19 connected to and activatable by the control device 33. The manual control element 26 is connected directly to the control device 33. In this embodiment, the drive module 19 is activated directly by the control device 33 in the event that a failure of the actuator 1 is detected such, for example, as by missing signals from the actuator 1. In addition, the driver of the vehicle can initiate emergency operation via the control device 33 by activating the manual control element 26.

Figure 4:
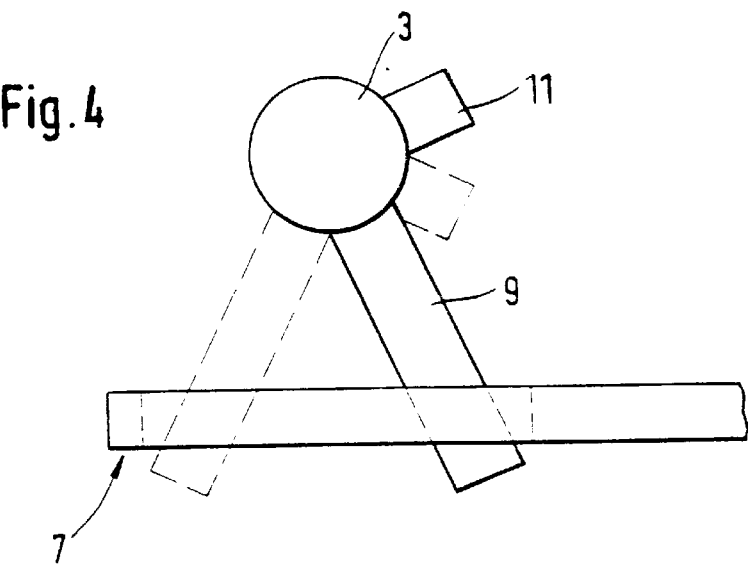
FIG. 4 is a top view of a central gearshift shaft of the adjustment element.

FIG. 4 shows the gearshift shaft 5, in particular, the radius of motion of the projection 9 in the gear shifting gate 7.

Figure 5:
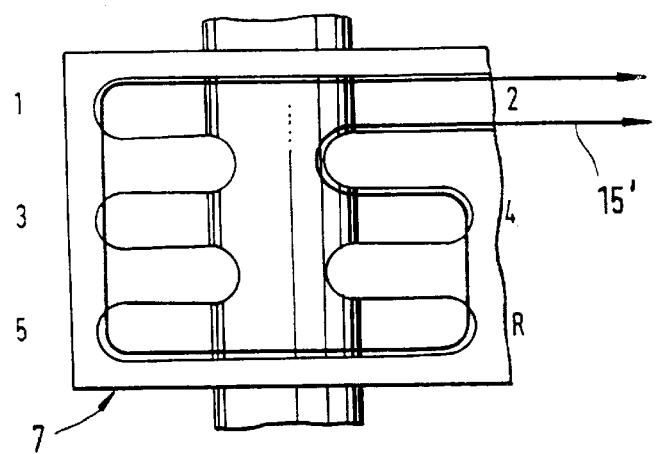
FIG. 5 shows another embodiment of the tension element of the adjustment element.

Referring now to FIG. 5, another embodiment of a tension element 15' is shown which forms a large loop enclosing the driving gears one through five and reverse. At least a few points of this loop of the tension element 15' are connected to the gear shift gate 7.

Figure 6:
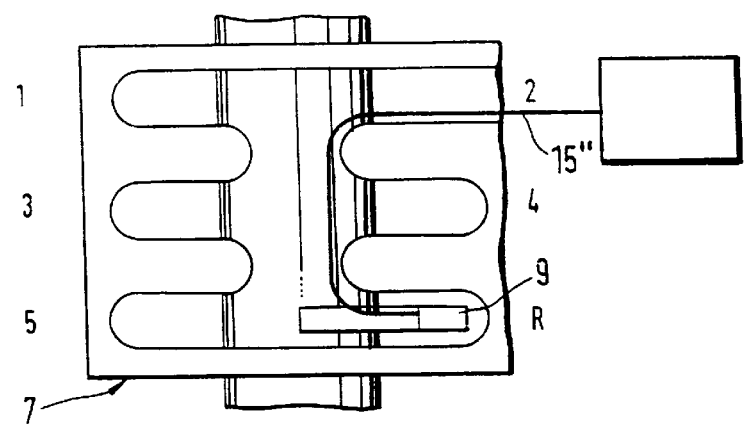
FIG. 6 shows another embodiment of the tension element firmly fixed to a gearshift shaft.

In FIG. 6, yet another embodiment of a tension element 15" is shown as firmly connected to the projection 9 of the gearshift shaft 5. Preferably, the tension element 15" is connected to a wind-up device, so that loose sagging by the tension element 15 is prevented. The wind-up device releases or takes up the tension element 15 during a gear shift without impairing the freedom of motion of the gearshift shaft.

Figure 7:
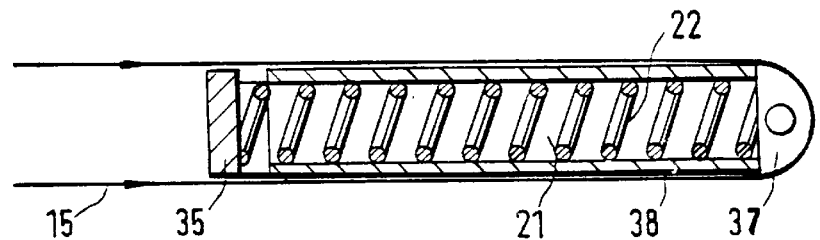
FIG. 7 is a sectional view along a longitudinal axis showing an embodiment of a tension element having an energy storage device and a fixing device.
Figure 8:
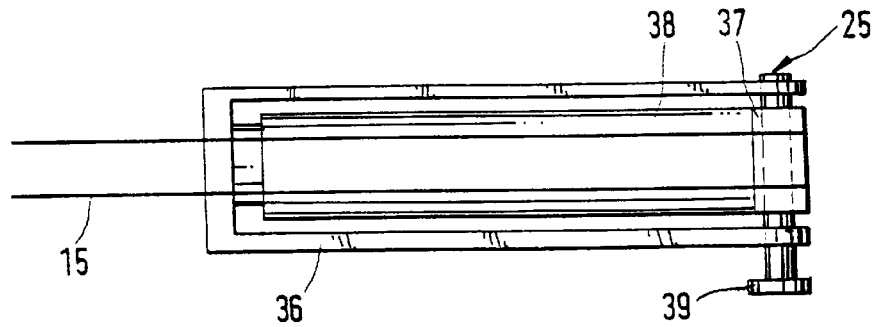
FIG. 8 is a top view of the tension element of FIG. 7.

FIGS. 7 and 8 illustrate an energy storage device 21 provided as the drive module 19. In FIG. 7, this energy storage device 21 comprises a spring element 22 supported against a stationary component 35 by the end facing the emergency operating device 13. The opposite end of the spring element 22 is connected to an end component 37. The tension element 15 is, in turn, connected to this end component 37. The connecting pin 24 of the coupling link 29 (see FIG. 3) may also be connected to the end component 37. As a result, the coupling link 29 is releasable when the emergency operating device 13 is activated. Firmly connected to the stationary component 35 is a sleeve 36, which is open at the end facing the end component 37. A second sleeve 38, which is firmly connected to the end component 37, is open at the end facing the stationary component 35. The two sleeves 36 and 38 are arranged co-axially in relation to one another and surround the spring element 22. Before the emergency operating device 13 is activated, the spring element 22 is installed between the stationary component 35 and the end component 37, and the end component 37 is fixed in place by means of a bolt 39, which is mounted in the stationary component 35 and, in the form of the fixing device 25, penetrates the end component 37. In this installed state, the sleeves 36 and 38 overlap one another almost completely over their respective extension areas. In the relaxed state of the spring element 22, there is only minimal axial overlap between the sleeves 36 and 38. These sleeves 36 and 38, co-axially surrounding the energy storage device, are provided to protect the spring element against, for example, dirt.

Referring again to FIG. 1, the operation of the adjustment device 50 is explained as follows: If the driver of the vehicle which is equipped with the adjustment device 50 detects that the actuator 1 has failed, the driver manually engages the manual control element 26. The engaged manual control element 26 triggers the emergency operating device 13 and the drive module 19. If, for example, the drive module 19 comprises the energy storage device 21 shown in FIGS. 7 and 8, then, when the manual control element 26 is operated, a bolt 39 is removed from the end component 37. Tension on the spring 22 relaxes, permitting the end component 37 to move in an axial direction. As a result, the connecting pin 24 of the coupling link 29 that is actively connected to the end component 37 is withdrawn from the gearshift shaft 5 for the purpose of releasing the coupling link 29. In addition, the tension element 15 connected to the end component 37 is activated. The tension element 15, if it was clipped into the gear shifting gate 7, is torn from its mounting. The tension element 15 is drawn out of the gear shifting gate 7. The loop formed by the tension element 15 becomes more and more narrow and wraps around the gearshift shaft projection 9 that moves in the gear shifting gate 7. If the projection 9 has not yet assumed the position corresponding to second gear, the projection 9 is drawn out of its present position, as a consequence of the ongoing force of the tension element 15, into the position 32 (FIG. 4) corresponding to second gear. The power thereby made available by the drive module 19 is set in such a fashion that assumption of this position is guaranteed. If an electric motor 27 (FIG. 1) is provided as the drive module 19, the length of the retraction—preferably, the rewinding—of the tension element is controlled for example, by setting the number of revolutions of the electric motor 27. To manually activate the tension element 15, a crank (not illustrated) connected to the tension element 15 may be provided that can be operated by the driver. By retracting or withdrawing the tension element 15, the gearshift shaft 5 can be drawn into the position 32 corresponding to second gear. With the vehicle in second gear, the driver can drive the vehicle, with some loss of comfort but at a thoroughly acceptable speed, to the next service station or repair shop without risk of damage to the vehicle. Instead of second gear, the adjustment device 50, 51 may also be designed such that the withdrawal of the tension element 15 draws the gearshift shaft 5 into any one of the other gears which is deemed appropriate for travel to the next service station or repair shop.

The function of the example shown in FIG. 2 corresponds to that described earlier, except that the control device 33 detects the failure of the actuator. When the control device 33 detects a failure, the emergency operating device 13 is activated automatically by the control device 33 without intervention by the driver. For example, a lifting magnet may be assigned to the fixing device 25, which lifting magnet can be activated by the control device 33 for the purpose of releasing the fixing device 25. In the same way, the actuator 1 can be uncoupled from the gearshift shaft 5. Parallel to this, a manual control element 26 may be also provided, so that the emergency operating device 13 can be still operated by the driver should the control device 33 fail.

The invention is not limited by the embodiments described above which are presented as examples only but can he modified in various ways within the scope of protection defined by the appended patent claims.

We claim:

1. An adjustment device in a motor vehicle for automatically operating a gear shift mechanism of a vehicular transmission having a plurality of gears for switching between the plurality of gears, comprising:

a gear input device operably connectable to the gear shift mechanism of the vehicular transmission such that a current operable gear of the transmission is responsive to a position of said gear input device;

an actuator operatively connected to said gear input device for moving said gear input device between positions associated with the plural gears of the transmission; and an emergency operating device comprising a tension element activatable for connecting to said gear input part and positioning said gear input part at a position associated with a selected one of the plural gears thereby enabling operation of the motor vehicle in the selected one of the plural gears during a failure of said actuator.

2. The adjustment device of claim 1, further comprising a coupling link connecting said actuator to said gear input part, wherein said coupling link disengages in response to said activation of said emergency operating device.

3. The adjustment device of claim 1, wherein said tension element is manually activatable.

4. The adjustment device of claim 1, further comprising a drive module connected to said tension element and said emergency operating device, wherein said drive module provides power for activating said tension element.

5. The adjustment device of claim 4, wherein said drive module comprises a pressure storage device.

6. The adjustment device of claim 4, wherein said drive module comprises an electric motor.

7. The adjustment device of claim 4, wherein said drive module comprises an energy storage device.

8. The adjustment device claim 7, further comprising a fixing device connected to said drive module for holding said drive module in a stressed position, wherein said tension element is activated by releasing said fixing device from said drive module.

9. The adjustment device of claim 7, wherein said energy storage device comprises a pre-stressed spring element.

10. The adjustment device of claim 1, further comprising a control element 26 operatively connected to said emergency operating device, wherein said emergency operating device is activatable in response to manual operation of said control element.

11. The adjustment device of claim 1, further comprising a control device connected to said actuator and said emergency operating device, for recognizing failure of said actuator and activating said emergency operating device in response to the recognized failure of said actuator.

12. The adjustment device of claim 1, wherein said tension element comprises a flexible element.

13. The adjustment device of claim 12, further comprising a gear shifting gate defining positions of said gear input device corresponding to the plural gears of the transmission, wherein said tension element is accommodated by said gear shifting gate.

* * * * *